United States Patent
Natesh et al.

(10) Patent No.: US 11,037,222 B1
(45) Date of Patent: Jun. 15, 2021

(54) DYNAMIC RECOMMENDATIONS PERSONALIZED BY HISTORICAL DATA

(71) Applicant: A9.com, Inc., Palo Alto, CA (US)

(72) Inventors: Aishwarya Natesh, Mountain View, CA (US); Pinkee Rasik Patel Gupta, San Mateo, CA (US); Andrea Joyce Diane Zehr, Palo Alto, CA (US); Sharmila Nagaraja Reddy, Fremont, CA (US); Whitney Chan, San Jose, CA (US); Deborah S. Hoo, Newark, CA (US)

(73) Assignee: A9.COM, INC., Palo Alto, CA (US)

( * ) Notice: Subject to any disclaimer, the term of this patent is extended or adjusted under 35 U.S.C. 154(b) by 271 days.

(21) Appl. No.: 16/113,565

(22) Filed: Aug. 27, 2018

(51) Int. Cl.
*G06Q 30/00* (2012.01)
*G06Q 30/06* (2012.01)

(52) U.S. Cl.
CPC ..... *G06Q 30/0631* (2013.01); *G06Q 30/0643* (2013.01)

(58) Field of Classification Search
CPC .................................................. G06Q 30/00
See application file for complete search history.

(56) References Cited

U.S. PATENT DOCUMENTS

| | | | |
|---|---|---|---|
| 10,049,397 B1 * | 8/2018 | Patankar | G06Q 30/0631 |
| 10,127,596 B1 * | 11/2018 | Franke | G06Q 30/0631 |
| 2011/0173078 A1 * | 7/2011 | Hicks | G06N 5/02 |
| | | | 705/14.66 |
| 2013/0013372 A1 * | 1/2013 | Gomez Uribe | G06Q 10/06 |
| | | | 705/7.29 |
| 2015/0058160 A1 * | 2/2015 | Cao | G06Q 30/0631 |
| | | | 705/26.7 |
| 2016/0148257 A1 * | 5/2016 | Chavarria | G06Q 20/24 |
| | | | 705/14.53 |

(Continued)

OTHER PUBLICATIONS

Pulkit, Sharma, "Comprehensive guide to build a recommendation engine from scratch (in python)", Analytics Vidhya, dated Jun. 21, 2018. (Year: 2018).*

(Continued)

*Primary Examiner* — Mark A Fadok
(74) *Attorney, Agent, or Firm* — Hogan Lovells US LLP

(57) ABSTRACT

Disclosed are various embodiments of systems and methods for dynamically generating and providing personalized recommendations of newer products or services potentially of interest to a particular user who has previously purchased a similar product or service. Historical purchase data or other information indicating the user's preferences is analyzed to determine personal preference data. Candidate content is identified based on attributes found in the preference data. Similarity strategies and criteria can be used to test features and qualities in candidate content. Recommended product or service content comes in the form of candidate content which reaches a similarity threshold or otherwise achieves a sufficient confidence score based at least in part on a similarity metric is determined. In accordance with various embodiments, the generation of newer product and service recommendations can be accomplished or optimized by training machine learning models, such as deep neural networks, using preference data for the particular user.

17 Claims, 6 Drawing Sheets

(56) References Cited

U.S. PATENT DOCUMENTS

| | | | | |
|---|---|---|---|---|
| 2016/0171535 | A1* | 6/2016 | Linden | G06Q 30/0255 |
| | | | | 705/14.53 |
| 2016/0364783 | A1* | 12/2016 | Ramanuja | G06Q 30/0631 |
| 2017/0024640 | A1* | 1/2017 | Deng | G06N 3/04 |
| 2017/0161618 | A1* | 6/2017 | Swaminathan | G06Q 30/02 |
| 2018/0218431 | A1* | 8/2018 | Prendki | G06Q 30/0631 |
| 2020/0226493 | A1* | 7/2020 | Hari Haran | G06F 16/38 |

OTHER PUBLICATIONS

Manuti Techlabs, What are Product recommendation Engines?, And the various versions of them?, towards data science, dated Sep. 28, 2017. (Year: 2017).*

Gu et al., "Recent Advances in Convolutional Neural Networks", arxiv.org, dated Oct. 19, 2017. (Year: 2017).*

\* cited by examiner

DYNAMIC RECOMMENDATIONS PERSONALIZED BY HISTORICAL DATA

BACKGROUND

In the present "information age," online shopping, whether for physical items or services such as media content, has become increasingly popular, both for the convenience it provides as well as the large selection of offerings available. As the number of users viewing information and making purchases electronically continues to grow, there is a corresponding increase in the amount of e-commerce platforms and electronic marketplace-type sources for products and services. While customers no doubt have their well-established styles, preferences, favorites, and the like, the overwhelming volume of website content regarding products and services available for purchase, particularly the newest offerings, can prove challenging for the customers. For example, a style-conscious customer may have a proverbial "uphill battle" when attempting to find the most recent and trendy apparel, in line with his or her style. And a description of an online offering may not accurately describe the item. Consequently, despite the availability of a wide array of products and services and despite being open to recommendations, a customer may typically purchase products and services haphazardly, with no good way to narrow the set of available offerings.

Purchase recommendations on websites may be proffered, based on general user data accumulated over time by the site providers, such as "Other users who bought Product A also bought Product B." However, such item recommendations provided to a given user may vary (e.g., by item type, category, and/or brand) and may not always be of current interest or relevant to a particular user. The fashion market is illustrative and, as noted, can be challenging for an online shopper. Of course, fashion is highly subjective and personal. A user may want to browse for items of a particular type, such as shoes of a particular brand or fashion, watches of a particular make, and the like. Further, the user may very well be confused by the lack of commonality among items recommended.

BRIEF DESCRIPTION OF THE DRAWINGS

Various embodiments in accordance with the present disclosure will be described with reference to the drawings, in which.

DETAILED DESCRIPTION

Figure 1A:
FIG. 1A illustrates a computing device accessing an example electronic marketplace website page configured to recommend items, in accordance with various embodiments of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure an embodiment being described.

Systems and methods in accordance with various embodiments of the present disclosure overcome one or more of the foregoing or other deficiencies experienced in conventional approaches for determining and recommending the latest, or at least newer, versions of product and/or service offerings potentially of interest to a consumer, including those taking advantage of the millions of e-commerce shopping options available. With an eye toward providing better recommendations to the consumer in line with current trends and styles, techniques described herein dynamically provide content recommending such new or updated versions of products and services, generally based on user preference data, product and service attributes and features, and similarity analyses.

Preference data regarding a user is obtained, with such data broadly encompassing historical data, such as past purchases, as well as virtually any data or indication of the user's personal styles, buying or browsing patterns, and the like. Attributes including unique identifier codes and physically-apparent properties can be identified in the user preference data, and one or more product or service recommendation candidates having the same or similar attributes are selected. An indexed catalog of the product and service attributes, features, and/or qualities may be generated. One or more similarity criteria or strategies can be applied to filter the identified product and services for recommendation, based on similarity of the features of the products and services to one or more attributes of the prior procurement and/or the user's style and preferences. Highly-ranked product or service offerings may be incorporated into content presented to the user, or at least made available for user access in any number of ways, including presentation and interaction via an e-commerce website content and interfaces, mobile app content and interfaces, and text/SMS messages. Thus the risk of an inapplicable or uninteresting product or service recommendation is reduced while saving the customer from time-consuming random searching among new product and service releases.

For example, a customer who is looking to update her professional wardrobe may navigate to a fashion-oriented e-commerce website, such as Amazon™ Fashion, and choose the occasion "work." The e-commerce service provider already knows that the customer has purchased a plain dress with a clean "A" line in the past; so, perhaps among other items, the provider recommends a dress with a trendy palm-style print with the same cut. It should be noted that the present systems and methods can provide recommendations for physical products with an objectively-recognizable style, but may be applied in any product or service recommendation setting for which a user's preferences and tastes are known, including the fields of books and music as well as entertainment services (i.e., recommending motion picture sequels or television program spin-offs similar to offerings the user has enjoyed in the past) and restaurant services (i.e., recommending new dining options similar to personal favorites).

Referring now to FIG. 1A, illustrated is an example page 100 of a website configured to provide content including item and service recommendations for user access, in accordance with some embodiments. The example website page 100 illustrated in FIG. 1A should not be interpreted as limiting in any way and is shown for illustrative purposes only. It will be appreciated that this example web page 100 may illustrate some portions of a page that may be pertinent to the present disclosure. Different user interface elements, icons, buttons, drop-down menus, and other user interface components may be included in the web page in addition to, or as an alternative to, the ones shown in FIG. 1A. Some user interface elements (e.g., windows, icons, buttons, and the like) may be configured to be selectable by the user.

The web page 100 may be displayed on a display screen (not shown) of a user or client computing device. The user may be authorized through means known in the art, such as by verification of an account and associated password. The web page 100 may be rendered, for example, by a browser 102. The web page 100 can include a window 104 in any known form (e.g., a drop-down menu, a selection box, or a space). The window 104 may enable the user to enter or otherwise input a search request for items or services offered via the website. The web page 100 may further include a search button or address bar 106 enabling a user to submit his or her search request to the website, once the search request is input in the field 106. In this example, a user of an electronic marketplace (or other such source of electronic content) has requested a page of content corresponding to dresses of interest to the user. The content can include, for example, an image of a recommended new version of a product 108, a description 110 of the new product, an option 112 to purchase the new product, and other such information or content.

The web page in FIG. 1A could have been accessed through a variety of different approaches, such as may be a result of a received search query, browse, or navigation request, among other such options. While a browser interface is shown as an example in FIG. 1A, it should be understood that other types of interfaces or displays of content can be presented as well, such as the interface 120 displayed as part of a mobile app displayed on a portable computing device 122 illustrated in FIG. 1B. This display similarly includes recommended content 124 relating to a new version of an object of interest, as well as descriptions 126 of same and an option 128 to purchase the recommended object.

Figure 2:
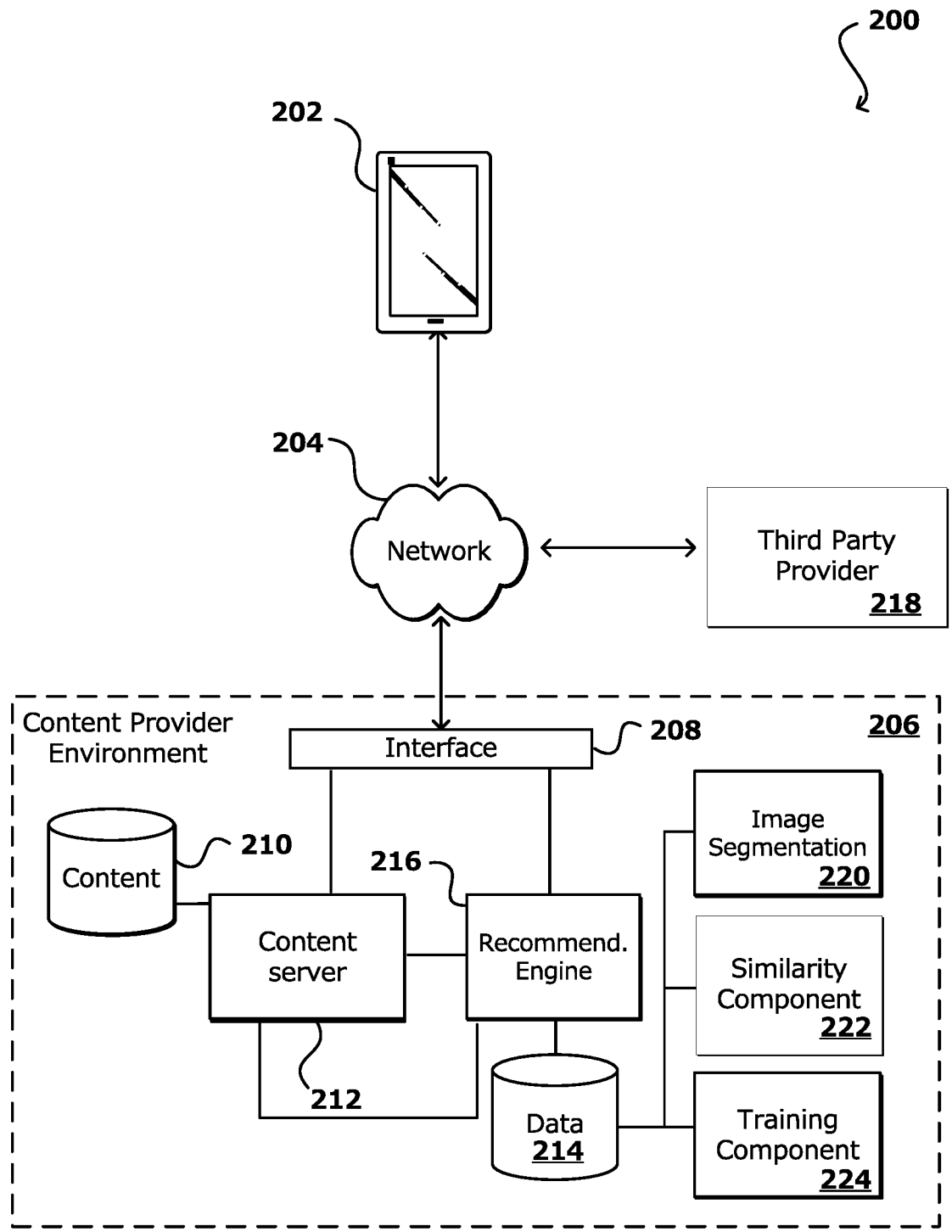
FIG. 2 illustrates an example computing environment for dynamically generating newer item recommendations, in accordance with various embodiments of the present disclosure, for a user already possessing a similar item.

In various embodiments, the content relating to the recommended product or service content can be served, or otherwise received from, the same or different providers over the same or different networks. FIG. 2 illustrates an example environment 200 for implementing aspects in accordance with various embodiments herein. As will be appreciated, although a web-based environment is used for purposes of explanation, different environments may be used, as appropriate, to implement various embodiments. Accordingly, it should be noted that additional services, providers, and/or components can be included in such a system, and, although some of the services, providers, and components are illustrated as being separate entities and/or components, the illustrated arrangement is provided as an example and other arrangements as known to one skilled in the art are contemplated by the embodiments described herein. Further, the recommendations herein may be generated by any number of server computing devices, desktop computing devices, mainframe computers, and the like. Each individual device may implement one of the modules of the recommendation system. In some embodiments, the recommendation system can include several devices physically or logically grouped together to implement one of the modules or components of the message service. In another embodiment, the recommendation system can execute on the same device.

In further embodiments, the recommendation system is provided by one more virtual machines implemented in a hosted computing environment. The hosted computing environment may include one or more rapidly provisioned and released computing resources, which computing resources may include computing, networking, and/or storage devices. A hosted computing environment may also be referred to as a "cloud" computing environment.

Clearly, the various embodiments can be implemented in a wide variety of operating environments, which in some cases can include one or more user computers, computing devices, or processing devices which can be used to operate any of a number of applications. The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in the accompanying figures. Thus, the depiction of the systems and environments in the figures should be taken as not limiting to the scope of the disclosure.

In this example of an electronic environment 200, a consumer or other user is able to use a client device 202 to submit a request for content, such as a web page, across at least one network 204. Although a portable computing device (e.g., a smartphone, tablet computer, or electronic book reader) is shown as the client device, it should be understood that any electronic device capable of receiving, determining, and/or processing input can be used in accordance with various embodiments discussed herein, and the client devices can include, for example, desktop computers, notebook computers, laptop computers, tablet computers, personal data assistants, video gaming consoles, television set top boxes, wearable computers (i.e., smart watches and glasses), and portable media players, among others.

The at least one network 204 can include any appropriate network, such as the internet or other wide area network (WAN), an intranet, a local area network (LAN), a cellular network, a Wi-Fi network, and the like. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof.

A request for content can be sent to an appropriate content provider environment 206, which can provide one or more services, systems, or applications for processing such requests. The content provider can be any source of digital or electronic content, and may include a website provider, an online/e-commerce retailer, a video or audio content distributor, an e-book publisher, and the like. In this example, the request is received by a network interface layer 208 of the content provider environment 206. The network interface layer 208 can include any appropriate components known or used to receive requests from across a network and may include one or more application programming interfaces (APIs) or other such interfaces for receiving such requests. The network interface layer 208 might be owned and operated by the e-commerce provider or leveraged by the provider as part of a shared resource offering. The network interface layer 208 can receive and analyze the request from the client device 202, and cause at least a portion of the information in the request to be directed to an appropriate system or service, such as content 210 on a content server 212 (e.g., a web server or application server), among other such options. In the case of webpages, for example, at least one server 212 might be used to generate code and send content for rendering the requested web page. In cases where processing is to be performed, such as to generate search results, perform an operation on a user input, verify information for the request, etc., information might also be directed to at least one other server for processing. Each server typically will include an operating system that provides executable program instructions for the general administration and operation of that server and typically will include computer-readable media storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein. It should be understood that there can be several application servers, layers, or other elements, processes, or components, which may be chained or otherwise configured and which can interact to perform tasks such as obtaining data from an appropriate data store 214.

The servers 212 or other components of the environment 200 might access one or more data stores 214, such as a user data store containing information about the various users, and one or more content repositories 210 storing content able to be served to those users. In some embodiments, data stores 214 and databases are employed for cataloging product and service offering, quality, and feature information. As used herein, the term "data store" refers to any component or combination of components capable of storing, accessing and retrieving data, which may include any combination and number of data servers, databases, data storage components, and data storage media, in any standard, distributed or clustered environment. The data store 214 can include several separate data tables, databases, or other data storage mechanisms and media for storing data relating to a particular aspect. For example, the data store 214 can include mechanisms for storing query completion content, training data for purposes of developing a neural network, and test results. The data store 214 is operable, through logic associated therewith, to receive instructions from a server 212 and obtain, update or otherwise process data in response thereto.

An application server can include any appropriate hardware and software for integrating with the data store 214 as needed to execute aspects of one or more applications for the client device and handling a majority of the data access and business logic for an application. The application server provides access control services in cooperation with the data store 214 and is able to generate content such as text, graphics, audio, and/or video to be transferred to the user, which may be served to the user by a web server in the form of HTML, XML, or another appropriate structured language. The handling of all requests and responses, as well as the delivery of content 210 between the client device 202 and an application server can be handled by a web server. It should be understood, though, that web and application servers are not required and are merely example components, as structured code can be executed on any appropriate device or host machine as discussed herein or known in the computing arts.

In at least some embodiments, the content 210 to be provided to the consumer can include data for one or more recommendations, advertisements, or other such elements that are selected based on information for the user associated with the request. For example, the content 210 may be facilitated by providing information to a recommendation engine 216, or other such component or service, for analyzing the provided information and attempting to generate recommendations or other elements as discussed herein. In some embodiments, this can utilize content 210 generated within the content provider environment 206 or received from one or more third party providers 218, among other such options. For example, a catalog of product and/or service offerings can be generated and indexed using images, metadata, or other information captured within the environment or received from the third party providers 218. Such a catalog may be updated in real-time as new products and/or services become available.

An image segmentation system 220 or other such component or service can analyze images to attempt to determine portions of those images that correspond to individual items or services having data stored in the content repository 210 or elsewhere in the content provider environment 206. This can include, by way of example, images of items available for consumption or items previously purchased by the user. Attribute, quality, and feature extractors running on servers, possibly on separate servers, may be used in the analysis of images or other qualities of product and service offerings.

The environment can also include a similarity system 222, or other such component or service, for analyzing data and attempting to locate content 210 for items and services that are at least somewhat similar by sharing one or more features or attributes. As will be detailed herein, such a similarity analysis can include comparing qualities, features, attributes, and other data, including images, against data stored for items and services in a catalog, data store 214, or other repository. Various other similarity-check optimizations can be utilized as well, within the scope of the various embodiments, as would be apparent to one of ordinary skill in the art in light of the teachings and suggestions contained herein. Based at least in part upon the similarity information, the recommendation engine 216 or component, or other such system, service, or component, can recommend to the consumer user newer items or services that may be associated in some way to past purchases or at least are in line with the user's personal preferences and style.

According to some embodiments, training images, used in connection with the neural network-based machine learning discussed herein, can be located in a data store 214 that includes images of a number of different items of interest, wherein each image can include metadata. As noted, the "items" are inclusive and include not only apparel and accessories, but any sort of product and services. The metadata can include, for example, the title and description associated with the items. For each image, an image segmentation component 220 can be used to segment the image, such that object represented in the image can be analyzed. Metadata associated with each image (or at least a portion of those images) can be segmented into n-grams (i.e., a set of words), and the n-grams are associated with a respective image. The analyzed images, n-grams, and the like can be used by the recommendation engine 216, in connection with historical data and item attributes, to generate recommendations for a user based on information known or obtainable with respect to the items for the matching images.

Further, a training component 224 can utilize the training data set to train one or more neural networks, including those of the sort detailed herein. Historical and/or other preference data can be used to train any machine learning tool, such as decision trees/forests and support vector machines (SVMs) deep networks. After training, the trained system can be used to predict which items or services should be recommended to the user.

In determining recommended content to provide to a user of an e-commerce platform, it can be desirable in at least some embodiments to determine content that is likely to be viewed and/or objects that are likely to be consumed by a user, based at least in part upon information known about the user. Accordingly, as noted, an aspect of the present systems and methods is the use of preference data, such as past purchases as well as virtually any data or indication concerning the user's personal styles, buying or browsing patterns, and the like. In many embodiments there will be information about items or content that the user has procured, purchased, consumed, viewed, or searched, among other such options. This can be combined with various other types of information in order to generate not only recommendations that are related to items or services already purchased, but are also relevant to the user based upon what is known about the particular user. As is known to those in the data sciences art, there are many algorithms and approaches which could be used for procuring and processing such historical and preference data and information for use in generating recommendations or suggestions to be displayed to a user.

Again, the preference data can comprise any indication of what a given customer owns, likes, and/or prefers. With regard to possible methods for collecting or otherwise obtaining the preference data regarding a customer, it can include purchase data compiled over time as well as any means capable of capturing the customer's likes and personal preferences. Thus, the present systems and methods could determine customer preference data through historical sales records (including those obtained from third-party databases) as well as via information gathering points such as text input by a user, photographs taken by a client device 202 camera, social media (such as Amazon, Inc.'s Spark social feed service aimed at product discovery), photographs in a database such as Amazon's Prime Photos service, "virtual assistants" such as Amazon, Inc.'s Alexa™ and Echo Look hands-free style assistant, and input gathered through "smart speakers" such as the Amazon Echo™. Software-based attribute and feature extractors, which can be running on a server, are applied in some embodiments to obtain the preference data.

In an illustrative embodiment, a customer may electronically upload one or more inspirational or thematic images, textual snippets or works, etc. leading to discovery of colors, locations, themes, and the like inspiring the customer to make a related purchase or stage an event in the vein of the uploaded subject matter. Collection of such preference data and information could even come in the form of a selection (via a drop-down menu or entry into a text box) of a high-level theme, for which the systems and methods herein can recognize a pattern in the areas such as fashion and decor (say, bohemian). For example, a customer wanting to stage a Hawaiian wedding could upload, to a website such as one built for e-commerce or a message board, a photo containing colors and other features invoking the state of Hawaii in the mind of the viewer.

Figure 1B:
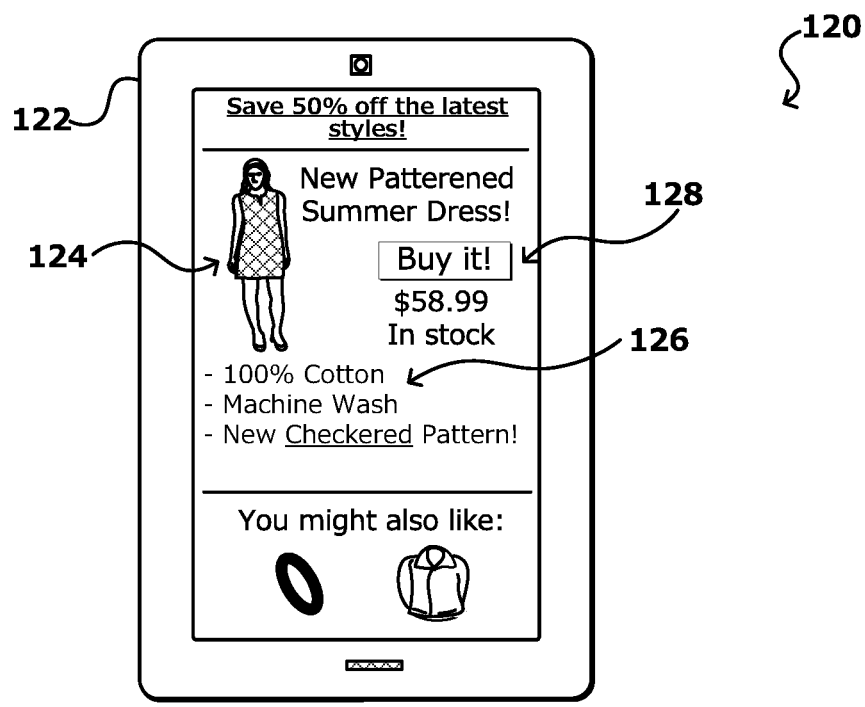
FIG. 1B illustrates another computing device accessing an example electronic marketplace website page configured to recommend items, in accordance with various embodiments of the present disclosure.
Figure 3:
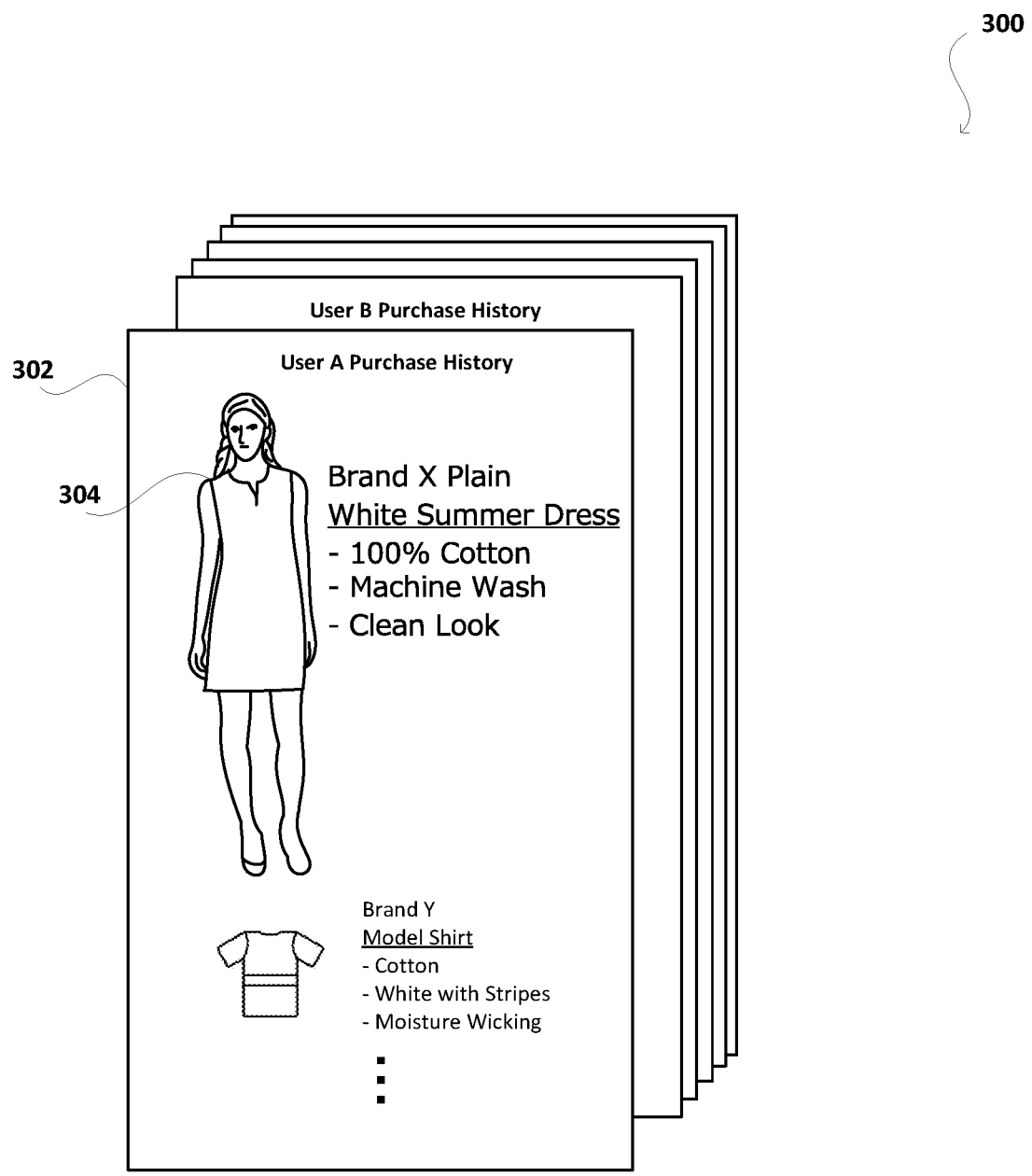
FIG. 3 illustrates a representation of historical purchase data of a given user of an electronic marketplace, in accordance with various embodiments of the present disclosure.

The sample compilation 300 of purchase histories in FIG. 3 illustrates that a given user's purchase history 302 includes an older, plain version 304 of the newer dress recommended in FIGS. 1A and 1B. The historical preference data can include past action data, such as information indicating items that were selected in response to a particular search and/or items that were purchased in response to a particular search. In tracking historical sales, metadata such as the Amazon Standard Identification Number ("ASIN") can be used. ASIN is a ten-character alphanumeric unique identifier assigned by Amazon.com and its partners for product identification within the Amazon organization.

In illustrative embodiments, the collected preference data for a given customer may be used for determining at least one attribute which will facilitate generation of a personalized recommendation. These attributes can concern the user, as well as products and services, and are open-ended and not restrictive in nature. Applied in the fashion realm, for example, the attributes can be in the form of the identity of similar products previously purchased in addition to concepts such as garment silhouettes, sizing, fitting, necklines, sleeve lengths, and colors. Likewise, in but one of many other applications, furniture or other home decor items (artwork, bedding, etc.) will have useable attributes such as material, size, use, era, and country of origin.

The provision of customized recommendations to the user may be based on various algorithmic techniques that may be employed by the provider. In generating such recommendations, the attributes ascertained from the customer preference data can be used to determine at least one product or service candidate for potential recommendation to the customer, potentially the newest or most recent release of the product or service. An analysis, visual inspection or otherwise, of items and/or services in an electronic catalog or other indexed data repository is performed in some embodiments in order to determine something about the qualities and characteristics, visual or otherwise, of the items and services. If it is known that a given product or service has a certain number of comparable qualities or features, it can be determined how many must, or are desired to be, compared. The qualities and features can be weighted, such that some are more important than others. Here, too, automated feature extractors, including those trained on a neural network, can be utilized. The outputs can be a descriptive and categorical mapping of the products and services and their respective qualities and features.

In generating a product or service offering recommendation via systems and methods hereunder, a similarity analysis may be performed in order to assure personalization of the recommendation. Similarity among individual features is calculated, and degrees of separation are estimated in some embodiments. Extracted product and service features and qualities can be compared against attributes found in the customer's personal data. Similarity of such features to the attributes can be defined in terms of estimated or approximated degrees of separation, potentially including a range defined by a minimum degree of separation and a maximum degree of separation. In one illustrative embodiment of the similarity strategy or criterion for comparing between two versions of an product or service quality, a feature vector is extracted from each of the versions, distance measurements are performed on the feature vectors, a threshold distance is established, and one or more similarity comparisons are performed against the threshold (i.e., whether a sleeve length quality is "short" or "long"). Establishing or learning the threshold may be by means known in the neural network art, such as a decision classifier, or simply combining all of the collected results. This can be done for all aesthetic or physical attributes, and, in the fashion context, would inform things such as sleeve length, silhouettes, necklines, colors, and patterns. Using techniques known in the art, such as the neural network and deep learning techniques for training a model to handle two or more features is possible and may involve one or more techniques.

In seeking a product or service offering to recommend to the user, contemplated are quality and feature-wise indexes and data stores 214 that catalog metadata, such as which ASINs contain a particular attribute found in the customer's preference data. As to ASINs and other unique identifiers, calculating degrees of separation entails extracting visual features from the associated items and extracting context features from the ASIN metadata.

In one approach for a similarity analysis, descriptors can be calculated or obtained for a subject image, and a comparison can be accomplished by comparing descriptors of the image to descriptors of stored media. This can include, for example, determining distances between the local-texture, global-shape, and local-shape descriptors of the subject image and the local-texture, global-shape, and local-shape descriptors of the stored media. According to some embodiments, dot product comparisons are performed between corresponding histogram descriptors and then normalized into similarity scores. It should be appreciated that, instead of a dot product comparison, any distance metric could be used to determine distance between the different types of descriptors, such as determining the Euclidian distance between the descriptors.

In performing a similarity analysis, a recommendation confidence score is used in some illustrative embodiments of the systems and methods herein, to tailor the product and services recommendations. The recommendation confidence score can represent how likely it is that the applicable customer will purchase the recommended product or service offering. A model generator can determine the confidence scores. The recommendation confidence score can be based at least in part on one or more performance metrics determined using information in the environment and can be determined by first obtaining historical information and other preference data from the data store 214. Based at least in part on the historical information and other preference data, a value for the recommendations that resulted in a sale to the customer can be determined. In the situation where the value meets a threshold value such as a threshold similarity, it can be assumed that the customer will likely be interested in the candidate offering. When the value does not meet the threshold value, it can be assumed that the customer would not be interested.

A particular type of confidence score can be in the form of a modernity score, which represents how modern or new a candidate product or service offering may be. An analysis of offering qualities, features, and metadata may be considered in calculating the modernity score. For example, when an ASIN is added to Amazon, Inc.'s catalog, the associated item's features can be analyzed for modernity, including a date comparison against timestamps for other, similar items. Further factors for considering modernity can come from analyses of influencers on social media, trade shows, conferences, conventions, and the like, with qualities and features extracted from references products and services. Such may entail the use of web crawlers and other software to analyze a website to determine product and service qualities and features. Potential websites to analyze for applicable influencer content can include social networks, message boards, forums, blogs or personal websites, business websites, e-commerce websites, business directory websites, question and answer websites, online community websites, auction websites, knowledgebase/wiki websites, podcasting websites, and periodical websites, among others. In the world of fashion, online information concerning runway shows will be of note. Movie, music, and/or restaurant critic websites could be analyzed to ascertain the "hip" place to go for dining, nightlife, and/or music.

In addition, deep learning neural network techniques may be applied her to recognize what is currently "trendy," beginning with a compilation of one or more influencer images illustrating a current trend and then conducting an analysis of the images for themes and features in common. Social media functionality can be useful here, at least for compiling influencer images, by searching for and compiling images tagged with a certain hashtag. The recommendation confidence score can be based at least in part on the determined modernity score. Thereafter, a recommendation for a particular product or service can be generated based at least in part on the confidence score. In another example, the e-commerce provider can determine the product or service offering recommendation and override content recommendations automatically generated by the systems and methods herein. In any event, in accordance with various embodiments, the recommended product or service content can then be made available to the user, including through a dedicated page or window of the user's web browser executing on a client device 202.

In presenting the recommended product or service offering to the user or otherwise making the personalized recommendation available to the user, as shown in FIGS. 1A and 1B, such notice may be made via listings and sections on an e-commerce website, via techniques known by those in the art. It is, of course, possible to update or apprise the customer in other ways. For example, an e-mail or text/SMS update, including a recommended new product or service offering, could be transmitted to a user whenever newer version of a previous purchase is released. Another opportunity for notifying the customer of a recommended offering can be provided by virtual assistants with access to camera functionality such as Amazon's Echo™ Look, to which a customer can ask the device how he or she "looks" or how he or she might update an outfit being worn before the camera; the assistant could suggest an updated top or slacks with certain features in a current style.

In some cases, the recommended offering content is specifically selected for certain pages or other interfaces displayed to a user. In other cases, the recommended content is selected based on content that can be displayed in any of a number of different pages. For example, a user might search for information about a keyword through a search engine. When a results page is returned to the user including search results relating to that keyword, at least one instance of recommended product or service content can be included with the results page that relates to the keyword and/or search results. Often, the recommended content will include a hypertext link or other user-selectable element that enables the user to navigate to another page or display relating to the recommended content.

As noted, neural network, deep learning, and other machine learning techniques can be applied to train a model used to generate, hone, and/or optimize the product and service recommendations hereunder, based on collected data and metadata, be it specific to the shopping user or a greater set of users. Such collected data and metadata will allow the systems and methods herein to "learn" meanings from systems' and particular users' patterns, histories, trends, tendencies, and the like, in order to automatically offer the end-user better-targeted recommendations, suggestions, and other content. For example, neural network techniques may be applied for purposes herein that include training a recommendation system for attribute and feature recognition and similarity determination. Generally speaking, in that context, an algorithm is applied to a set of sample images in order to localize the inspection area in the images to, say, check necklines; the system then "learns" what different necklines exist and "learns" what to label that feature; and a deep learning network is then trained to perform such recognition and determination.

As is known in the neural network and artificial intelligence arts, a variety of neural network types could be applied, including, but by no means limited to, feedforward, recurrent, radial basis function, modular, and self-organizing neural networks. Prior to production environment use, a non-production sample data set may be employed for training a neural network model for generating the recommendation content. The systems and methods can use a beam search or other algorithm to efficiently rank the recommendation content, and optimizations in some embodiments are made to a predictive system so that the optimized recommendations can be made in real time. Although graphics processing units (GPUs) are effective for many deep learning neural network applications, the present systems and methods can be used with GPU-based or central processing unit (CPU)-based systems.

More particularly, with the emergence of the deep convolutional neural network (CNN), a programming and information processing paradigm allowing a machine to learn from data, object detection performance has improved significantly. CNNs are a family of statistical learning models used in machine learning applications to estimate or approximate functions that depend on a large number of inputs. The various inputs are interconnected with the connections having numeric weights that can be tuned over time, enabling the networks to be capable of "learning" based on additional information. The adaptive numeric weights can be thought of as connection strengths between various inputs of the network, although the networks can include both adaptive and non-adaptive components. CNNs exploit spatially-local correlation by enforcing a local connectivity pattern between nodes of adjacent layers of the network. Different layers of the network can be composed for different purposes, such as convolution and sub-sampling. There is an input layer, which along with a set of adjacent layers, forms the convolution portion of the network. The bottom layer of the convolution layer, along with a lower layer and an output layer, makes up the fully-connected portion of the network. A number of output values can be determined from the output layer, which can include several items determined to be related to an input item, among other such options.

A CNN is trained on a similar data set (which could include, for example, dresses, pants, watches, earrings, necklaces, belts, and sunglasses, among other apparel products), so it learns the best representation of a feature represented for this type of image. An example process for training a CNN for generating descriptors describing visual features of an image in a collection of images begins with building a set of training images. The CNN starts with processing an image (such as a 7×7 network output with vectors) and, as processing moves along, the image area being analyzed gets smaller. The trained CNN is used as a feature extractor: an input image is passed through the network and intermediate outputs of layers can be used as feature descriptor of the input image. In accordance with various embodiments, a CNN can be used to determine features represented in an image by disregarding irrelevant elements and capture subtle variations between different features.

Well known in the art, a CNN was first proposed to use a convolutional network as a visual classifier for proposals of objects that may be in media content. More recently in the art, several algorithms take a further step toward single-stage object detection, without using object proposals, achieving some success in better computation efficiency and competitive detection performance. Still, a two-stage object detection framework integrates the object proposal stage into a CNN and trains the processing pipeline, end-to-end, obtaining state-of-the-art performance.

Even more particularly, a query image from the training data set is analyzed using the CNN to extract a feature vector from the network before the classification layer. This feature vector describes the subject feature of the relevant item represented in the image, while ignoring other features and elements. This process can be implemented for each of the images in the data set, and the resulting feature vectors can be stored in a data store 214. In various embodiments, the resulting feature vectors can be compressed for improved processing. The dimensions of the feature vectors can be reduced by applying at least one of Principal Component Analysis (PCA) or Multi-Dimensional Scaling (MDS). Advantageously, such an approach can reduce storage demands and significantly improve latency performance. Additionally, such an approach can remove or at least reduce noise in the transformed space, since the tailing dimensions generally correspond to noise and discarding them helps to focus on the useful signal when measuring similarities.

Similarity scores can be calculated based on the distance between the one or more feature descriptors and the one or more candidate content feature descriptors and used for building relation graphs. For example, distances may be determined between the local-texture, global-shape, and local-shape descriptors of a query image and the local-texture, global-shape, and local-shape color descriptors of the images in the collection of images. According to some embodiments, dot product comparisons are performed between the descriptors of the query image and the corresponding color descriptors of the images of the collection. The dot product comparisons are then normalized into similarity scores. Thus, between any two images, three similarity scores are provided: (1) a similarity score between the local-texture descriptors of the images; (2) a similarity score between the global-shape descriptors of the images; and (3) a similarity score between the local-shape descriptors of the images. After similarity scores are calculated between the different types of feature descriptors of the images, the similarity scores can be combined by a linear combination or by a tree-based comparison that learns the combinations. For example, using a linear combination may provide the advantage of enabling a user to assign different weights to the different types of descriptors, thereby causing the search module to consider the weighting when selecting the nearest feature match. It should be appreciated that instead of a dot product comparison, any distance metric could be used to determine distance between the different types of color descriptors, such as determining the Euclidian distance between the color descriptors.

Any type of neural network employed in connection with the present disclosure will likely need tweaking and/or additional or alternative elements to fit the specifics of the particular situations. In certain embodiments, training a CNN may involve significant use of computation resources and time, such that this may correspond to a preparatory step to servicing requests and/or performed relatively infrequently with respect to request servicing and/or according to a schedule. As known in the object-oriented and other computer science arts, the attribute and feature detection hereunder may be accomplished through the use of separate software modules executing on top of a feature map.

Figure 4:
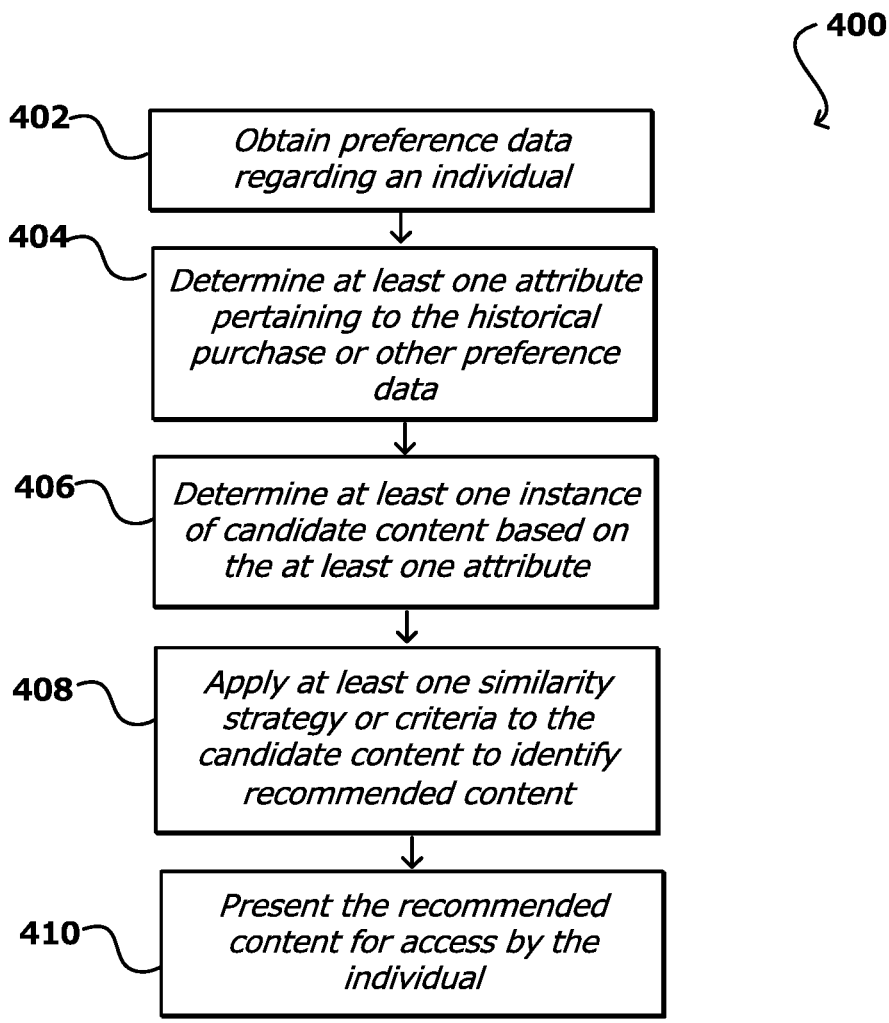
FIG. 4 is a block flow diagram illustrating an example process for dynamically generating and providing recommendations, in accordance with various embodiments of the present disclosure, for a newer item similar to an item already possessed by a user.

FIG. 4 illustrates a general flow diagram of an example process 400 for determining dynamic, personalized recommendations in accordance with various embodiments. It should be understood that, for this and other processes discussed herein, there can be additional, alternative, or fewer steps performed in similar or alternate orders, or at least partially in parallel, within the scope of the various embodiments unless otherwise specifically stated.

The representative process 400 can commence in illustrative embodiments with obtaining 402 user preference data in the form of information relating to past purchases or, as indicated herein, anything serving to indicate the user's personal style, preferences, tastes, "likes," etc. At least one attribute pertaining to that user preference data may be determined 404, with such attributes open-ended and potentially including unique identifier codes as well as physically-apparent properties. Based on the determined attribute, one or more instances of candidate content are determined 406: for example, in the form of product or service offerings which are deemed to possess extracted features or qualities that are the same as, or similar to, the attributes pertaining to the user's historical purchases or other preference data. A similarity analysis may be applied 408, optionally by a similarity component or module, to the determined instance of candidate content. At least one similarity strategy or criterion is utilized to select recommended content for the particular user. As noted, this recommended content can be in the form of a personalized suggestion of a newer product or service similar to one procured by the user in the past, thereby allowing the user to, for example, update existing apparel in his or her wardrobe. Finally, the recommended content is presented or otherwise made available 410 for access by the user.

As may be seen, such a process is capable of presenting items that are very similar to past purchases or items already in the consumer's possession, but with one or more different features which add a modern twist. The variations presented by the recommended content can include dramatic or slight variations, such as being in the most current styles. By way of example, if it is determined that a user already owns a certain black cocktail dress, a recommendation to that customer could be a similar black dress with a more "trendy" neckline and/or a sleeve length currently seen on fashion show runways and the like. Likewise, furniture or other home decor items which reflect colors currently in vogue could be recommended to users.

Figure 5:
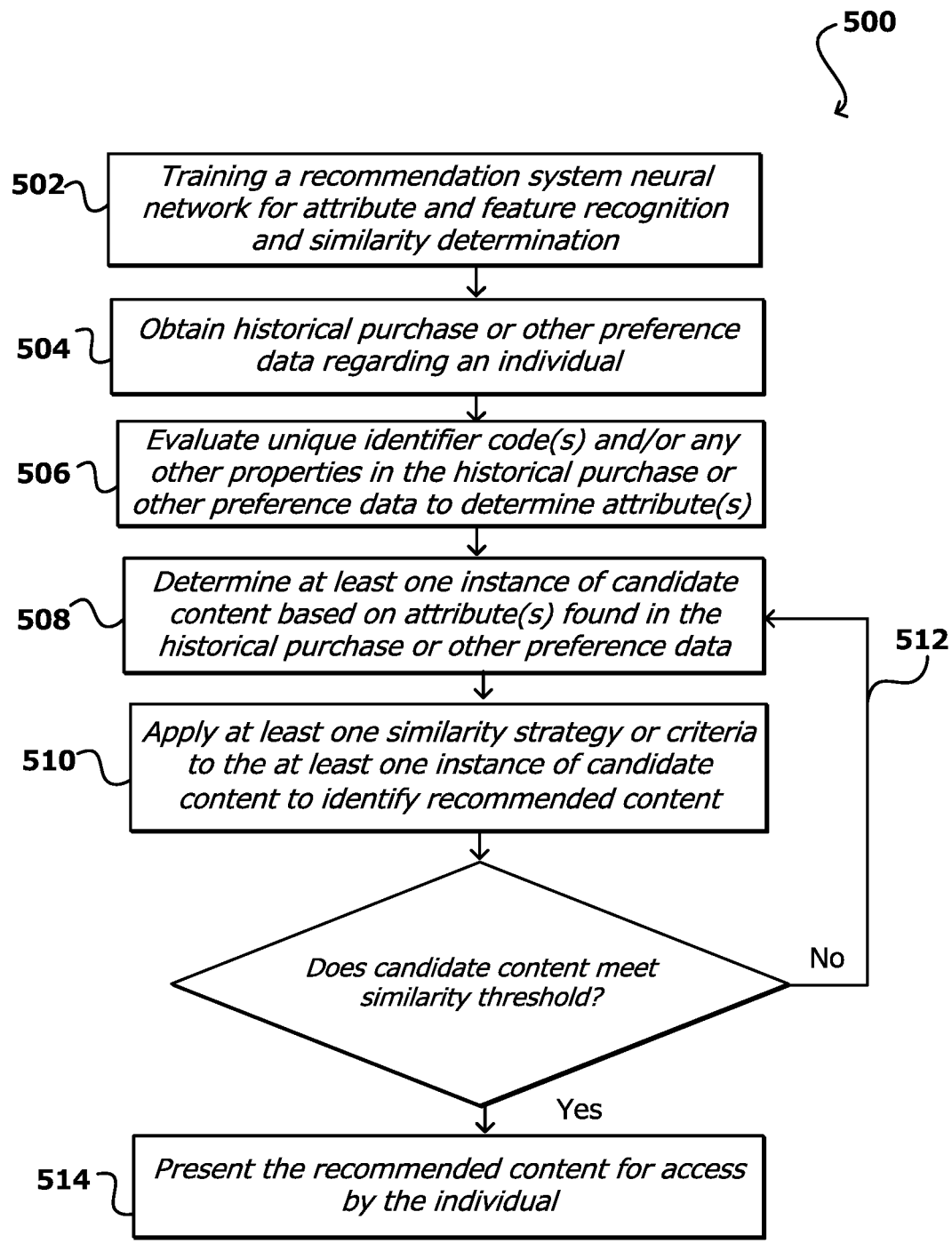
FIG. 5 is a block flow diagram illustrating another example process for dynamically generating and providing recommendations, in accordance with various embodiments of the present disclosure, for a newer item similar to an item already possessed by a user.

FIG. 5 illustrates a flow diagram of another example process 500 for determining dynamic, personalized recommendations in accordance with various embodiments. This representative process can commence with, as discussed herein, a step of training 502 a neural network component of a recommendation system for attribute and feature recognition and similarity determination. A subsequent step entails obtaining or otherwise accessing 504 user preference data in the form of information relating to past purchases or, as indicated herein, anything serving to indicate the user's personal taste, style, and preferences. At that point, unique identifier codes and/or any other properties relating to the user preference data are extracted and evaluated to determine 506 at least one attribute pertaining to the user preference data. As discussed, one or more instances of candidate content is then determined 508 by an analysis of the indexed catalog of available product or service offerings and ascertaining those which possess features or qualities that are the same as, or similar to, the attributes pertaining to the user's historical purchases or other preference data. A similarity component of the system may perform an analysis 510 on the determined instance of candidate product or service content, with a strategy or criterion utilized to select recommended product or service content for the particular user. If the analysis results in a determination that the candidate content does not meet a similarity threshold 512, predetermined or otherwise, an attempt to find a new instance of candidate content can be made. Once a recommended product or service is found, such recommended content is presented or otherwise made available 514 for access by the user. As discussed, different approaches can be implemented in various environments in accordance with the described embodiments.

Figure 6A:
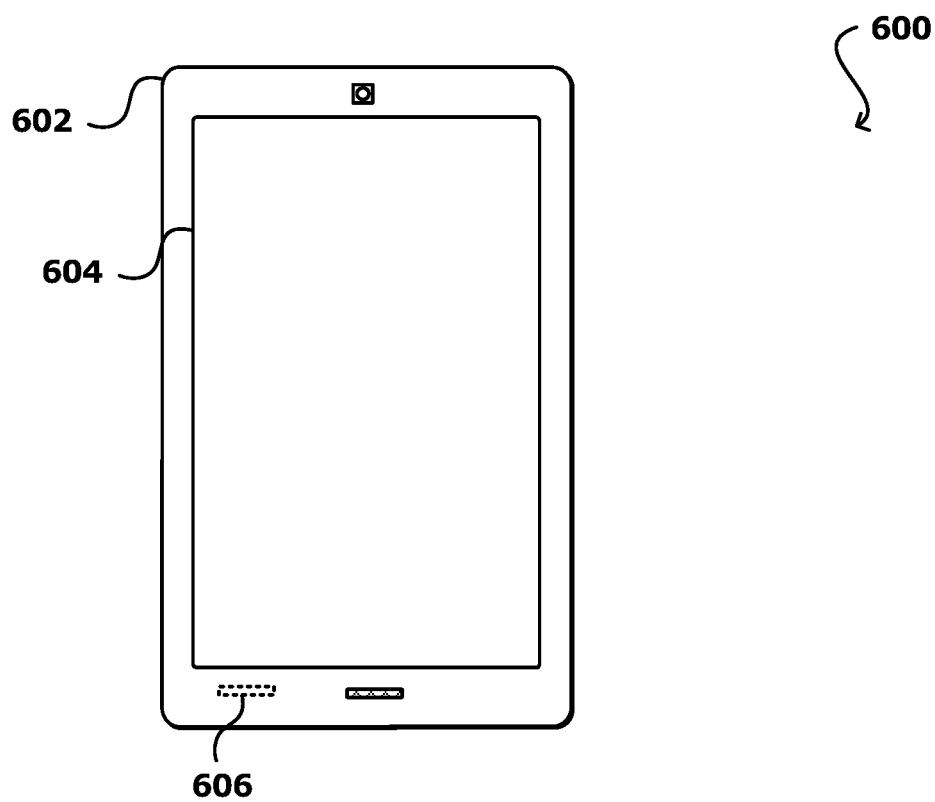
FIG. 6A illustrates a representative mobile computing device for accessing recommendations provided in accordance with various embodiments of the present disclosure.

As noted and illustrated in FIG. 6A, the systems and methods include the use of electronic client devices 600, which can include any appropriate device operable to send and receive requests, messages, or information over an appropriate network and convey information back to a user of the device. User or client devices 600 can include any of a number of general purpose personal computers, such as desktop or laptop computers running a standard operating system, as well as cellular, wireless, and handheld devices running mobile software and capable of supporting a number of networking and messaging protocols. Examples of such client devices include personal computers, cell phones, handheld messaging devices, laptop computers, tablet computers, set-top boxes, personal data assistants, electronic book readers and the like. In the FIG. 6A example, the computing device 600 has an outer casing 602 and a display screen 604. The display screen 604 under normal operation will display information to a user (or viewer) facing the display screen (e.g., on the same side of the computing device as the display screen). In line with the disclosure herein, the device can include one or more communication components 606, such as may include a cellular communications subsystem, Wi-Fi communications subsystem, Bluetooth® communication subsystem, and the like. Such a device also can be in the form of workstations running any of a variety of commercially-available operating systems and other known applications for purposes such as development and database management. These devices also can include other electronic devices, such as dummy terminals, thin-clients, gaming systems, and other devices capable of communicating via a network.

Figure 6B:
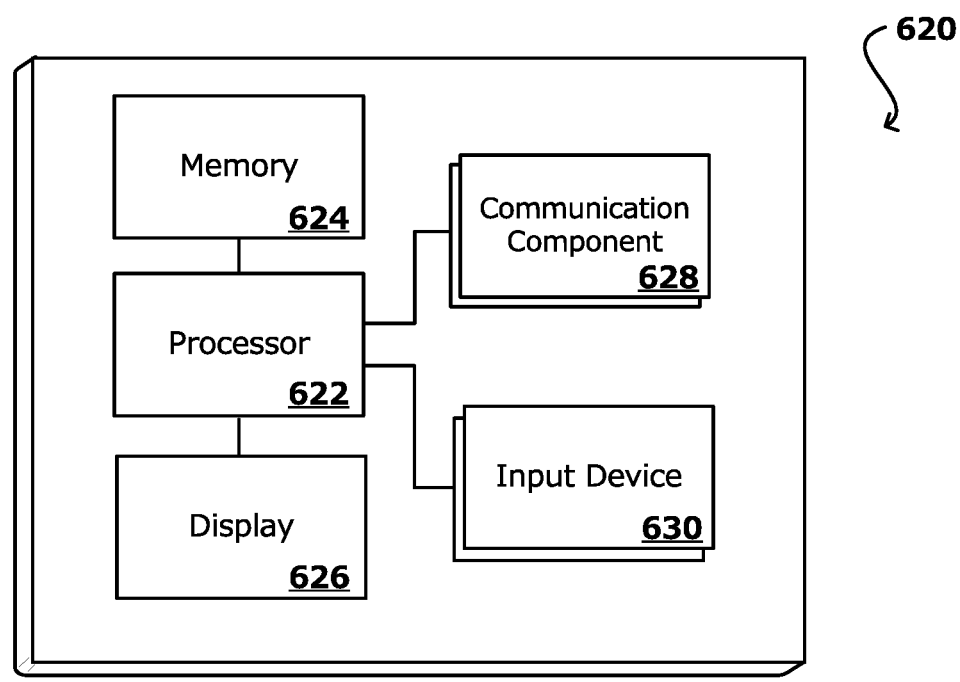
FIG. 6B illustrates example basic components of representative computing devices for accessing recommendations provided in accordance with various embodiments of the present disclosure.

FIG. 6B illustrates a set of basic components of an example client or other computing device 620 that can be utilized to implement aspects of the various embodiments. In this example, the device includes at least one processor 6222 for executing instructions that can be stored in a memory device or element 624. As would be apparent to one of ordinary skill in the art, the device can include many types of memory 624, data storage, or computer-readable media, such as a first data storage for program instructions for execution by the at least one processor 622. The same or separate storage can be used for images or data, a removable memory can be available for sharing information with other devices, and any number of communication approaches can be available for sharing with other devices. The device 620 may include at least one type of display element 626, such as a touch screen, electronic ink (e-ink), organic light emitting diode (OLED), or liquid crystal display (LCD), although devices such as servers might convey information via other means, such as through a system of lights and data transmissions. The device 620 typically will include one or more networking components 628, such as a port, network interface card, or wireless transceiver that enables communication over at least one network. The device 620 can further include at least one input device 630 able to receive conventional input from a user. This conventional input can include, for example, a push button, touch pad, touch screen, wheel, joystick, keyboard, mouse, trackball, keypad, or any other such device or element whereby a user can input a command to the device. These I/O devices could even be connected by a wireless infrared or Bluetooth® or other link as well in some embodiments. In some embodiments, however, such a device 620 might not include any buttons at all and might be controlled only through a combination of visual and audio commands such that a user can control the device 620 without having to be in contact with the device.

Various aspects also can be implemented as part of at least one service or web service, such as may be part of a service-oriented architecture. Services such as web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as Transmission Control Protocol/Internet Protocol (TCP/IP), Open System Interconnection (OSI), File Transfer Protocol (FTP), Universal Plug and Play (UpnP), Network File System (NFS), Common Internet File System (CIFS), and AppleTalk. Again, the network can be, for example, a local area network, a wide-area network, a virtual private network, the internet, an intranet, an extranet, a public switched telephone network, an infrared network, a wireless network, and any combination thereof.

In embodiments utilizing a web server, the web server can run any of a variety of server or mid-tier applications, including Hypertext Transfer Protocol (HTTP) servers, File Transfer Protocol (FTP) servers, Common Gateway Interface (CGI) servers, data servers, Java servers, and business application servers. The server(s) also may be capable of executing programs or scripts in response requests from user devices, such as by executing one or more web applications that may be implemented as one or more scripts or programs written in any programming language, such as Java®, C, C # or C++, or any scripting language, such as Perl, Python, or TCL, as well as combinations thereof. The server(s) may also include database servers, including, without limitation, those commercially available from Oracle®, Microsoft®, Sybase®, and IBM®.

Based on the disclosure and teachings provided herein, a person of ordinary skill in the art will appreciate other ways and/or methods to implement the various embodiments. The specification and drawings are, accordingly, to be regarded in an illustrative, rather than a restrictive, sense. It will be evident that various modifications and changes may be made thereunto without departing from the broader spirit and scope of the invention as set forth in the claims.

Note that, while terms such as "purchase" and "sale" are employed herein for convenience, as with all language in this disclosure, such terms are not intended to be limiting and encompass any number of ways and means for customers to exchange and benefit from products and services, including sales/purchases, leases/renting, and bartering/swapping. Likewise, the term "individual" is used for convenience, but may encompass any sort of entity, including a corporate account (be it authorized or otherwise). In this vein, the use of the terms "a," "an," and "the," and similar referents, in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure. Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

What is claimed is:

1. A computer-implemented method, comprising:
    training a convolutional neural network using a sample data set, the sample data set including representative procurement data;
    determining, by the convolutional neural network, representative attributes found in the representative procurement data, a predetermined minimum degree of separation, and a predetermined maximum degree of separation;
    extracting, by the convolutional neural network, one or more visual characteristics associated with an offering not included in the sample data set;
    obtaining preference data regarding an individual, the preference data including at least one of data regarding a previous item purchased by the individual or data regarding personal preferences maintained by the individual;
    determining, based at least in part on at least one of the representative attributes or the preference data, at least one preference attribute;
    determining at least one recommendation candidate based on the at least one preference attribute;
    confirming that the at least one recommendation candidate is a newer version of the previous item purchased by the individual, based at least in part on one of a timestamp or the one or more visual characteristics;
    comparing, by the convolutional neural network, the at least one preference attribute and at least one feature extracted from the at least one recommendation candidate, based at least in part on a degree of separation between the at least one feature and the at least one preference attribute;
    verifying, by the convolutional neural network, that the degree of separation between the at least one feature and the at least one preference attribute is within a range defined by the predetermined minimum degree of separation and the predetermined maximum degree of separation; and
    presenting the recommendation candidate for access.

2. The computer-implemented method of claim 1, further comprising:
    indexing the one or more visual characteristics in a catalog, the catalog accessible when determining the at least one recommendation candidate.

3. The computer-implemented method of claim 2, wherein the one or more visual characteristics include at least one of a color, a pattern, or a silhouette.

4. A computer-implemented method, comprising:
    training a neural network using a sample data set including representative procurement data;
    determining, by the neural network, representative attributes found in the representative procurement data;
    determining, by the neural network and based at least in part on the representative attributes, a predetermined minimum degree of separation;
    extracting, by the neural network, one or more visual characteristics associated with an offering not included in the sample data set obtaining preference data regarding an individual;
    determining, based at least in part on at least one of the representative attributes or the preference data, at least one preference attribute;
    determining at least one candidate based on at least one of the at least one preference attribute or the one or more visual characteristics;
    applying, by the neural network, at least one similarity criterion to the at least one candidate to identify a recommended content, the at least one similarity criterion based at least in part on the minimum degree of separation between the at least one preference attribute and a feature extracted from the at least one candidate; and
    presenting the recommended content for access.

5. The computer-implemented method of claim 4, wherein the preference data includes at least one of data regarding a previous procurement by the individual or data regarding personal preferences maintained by the individual.

6. The computer-implemented method of claim 5, further comprising:
    confirming that the at least one candidate is a newer version of the previous procurement by the individual, based at least in part on one of a timestamp or a unique identifier.

7. The computer-implemented method of claim 4, further comprising:
    confirming, by a confidence score meeting a predetermined threshold, selection of the at least one candidate.

8. The computer-implemented method of claim 4, further comprising:
    calculating an estimated degree of separation between the at least one preference attribute and the feature extracted from the at least one candidate.

9. The computer-implemented method of claim 4, further comprising:
    indexing the one or more visual characteristics in a catalog, the catalog accessible when determining the at least one candidate.

10. The computer-implemented method of claim 7, wherein the confidence score is a modernity score based at least in part on one of a timestamp, metadata, or information obtained through social media.

11. A computing system, comprising:
    at least computing device processor;
    a memory device including instructions that, when executed by the at least one computing device processor, enables the computing system to:
        train a neural network using a sample data set including representative procurement data;
        determine, by the neural network, representative attributes found in the representative procurement data;
        determine, by the neural network and based at least in part on the representative attributes, a predetermined minimum degree of separation;
        extract, by the neural network, one or more visual characteristics associated with an offering not included in the sample data set;
        obtain preference data regarding an individual;
        determine, based at least in part on at least one of the representative attributes or the preference data, at least one preference attribute;
        determine at least one candidate based on at least one of the at least one preference attribute or the one or more visual characteristics;
        apply, by the neural network, at least one similarity criterion to the at least one candidate to identify a recommended content, the at least one similarity criterion based at least in part on a minimum degree of separation between the at least one preference attribute and a feature extracted from the at least one candidate; and
        present the recommended content for access.

12. The computing system of claim 11, wherein the preference data includes at least one of data regarding a previous procurement by the individual or data regarding personal preferences maintained by the individual.

13. The computing system of claim 12, wherein the instructions, when executed, further enable the computing system to:
confirm that the at least one candidate is a newer version of the previous procurement by the individual, based at least in part on one of a timestamp or a unique identifier.

14. The computing system of claim 11, wherein the instructions, when executed, further enable the computing system to:
confirm, by a confidence score meeting a predetermined threshold, selection of the at least one candidate.

15. The computing system of claim 11, wherein the instructions, when executed, further enable the computing system to:
calculate an estimated degree of separation between the at least one preference attribute and the feature extracted from the at least one candidate.

16. The computing system of claim 11, wherein the instructions, when executed, further enable the computing system to:
index the one or more visual characteristics in a catalog, the catalog accessible when determining the at least one candidate.

17. The computing system of claim 14, wherein the confidence score is a modernity score based at least in part on one of a timestamp, metadata, or information obtained through social media.

\* \* \* \* \*